United States Patent [19]

Lipinski

[11] Patent Number: 6,031,042

[45] Date of Patent: *Feb. 29, 2000

[54] SOFT NITRILE RUBBER FORMULATION

[75] Inventor: Timothy M. Lipinski, Charleston, S.C.

[73] Assignee: North Safety Products Inc., Charleston, S.C.

[*] Notice: This patent issued on a continued prosecution application filed under 37 CFR 1.53(d), and is subject to the twenty year patent term provisions of 35 U.S.C. 154(a)(2).

[21] Appl. No.: 08/667,008

[22] Filed: Jun. 20, 1996

[51] Int. Cl.[7] ...................................................... C08J 55/00
[52] U.S. Cl. ........................... 524/566; 524/556; 524/560
[58] Field of Search ..................................... 524/566, 556, 524/560

[56] References Cited

U.S. PATENT DOCUMENTS

| | | | |
|---|---|---|---|
| 5,014,362 | 5/1991 | Tillotson et al. | 2/168 |
| 5,051,200 | 9/1991 | Srail et al. | 252/439 |
| 5,284,157 | 2/1994 | Miller et al. | 128/844 |
| 5,326,828 | 7/1994 | Rowland et al. | 525/346 |
| 5,369,166 | 11/1994 | Ozawa et al. | 524/560 |
| 5,397,839 | 3/1995 | Patel | 525/175 |

*Primary Examiner*—Peter D. Mulcahy
*Attorney, Agent, or Firm*—Lahive & Cockfield, LLP

[57] ABSTRACT

Nitrile rubber compositions, articles of manufacture made therefrom, and methods of making them, are disclosed. The nitrile rubber compositions of the invention are substantially free of zinc oxide, and have good strength and chemical resistance while being softer than many conventional nitrile rubbers. The invention provides articles of manufacture, including gloves, which are soft, yet strong, and can be economically manufactured.

10 Claims, 2 Drawing Sheets

SOFT NITRILE RUBBER FORMULATION

THE BACKGROUND OF THE INVENTION

The development of modern rubber materials has made possible the manufacture of a wide range of elastomeric articles having varying properties of strength and chemical resistance. One useful class of rubber compounds is the nitrile rubber class, which is widely used to make a variety of articles of manufacture.

Carboxylated nitrile, which is a terpolymer of butadiene, acrylonitrile, and organic acid monomers, has at least two properties that make it useful for manufacturing elastomeric articles. These two features are high strength and impermeability to certain hydrocarbon solvents and oils. Compounding and curing the rubber (which is used in latex form for, e.g., dipping to provide articles of manufacture such as gloves or condoms) with other ingredients such as curing agents, accelerators, and activators is generally performed to optimize these properties. The level of each monomer in the polymer and the level of curing affect the levels of strength and the chemical resistance in the finished article. Polymers with higher levels of acrylonitrile tend to have better resistance to aliphatic oils and solvents, but are also stiffer than polymers that have lower levels of acrylonitrile. While the chemical nature of the monomers from which the polymer is made offers some degree of chemical resistance, when the polymer molecules are chemically crosslinked, resistance to chemical swelling, permeation, and dissolution greatly increase.

Crosslinking also increases the strength and elasticity of the rubber. Carboxylated nitrile latexes can be chemically crosslinked in at least two ways: the butadiene subunits can be covalently crosslinked with sulfur/accelerator systems; and the carboxylated (organic acid) sites can be ionically crosslinked with metal oxides or salts. Sulfur crosslinks often result in large improvements in oil and chemical resistance. Ionic crosslinks, resulting from, for example, the addition of zinc oxide to the latex, result in a rubber having high tensile strength, puncture resistance, and abrasion resistance, as well as high elastic modulus (a measure of the force required to stretch a film of the rubber), but poor oil and chemical resistance. Many currently available rubber formulations generally employ a combination of the two curing mechanisms. For example, in combination with sulfur and accelerators, carboxylated nitrile latex manufacturers frequently recommend addition of 1–10 parts of zinc oxide per 100 parts of rubber.

When zinc oxide is not employed, the curing time required to reach an optimum state of cure can be much longer and the curing may be less efficient. This means that the crosslinks are longer (more sulfur atoms per crosslink) and there may be a higher amount of sulfur that does not crosslink polymer chains. The result can be a less-effectively cured rubber that has lowered heat resistance and less chemical resistance.

However, ionic crosslinking often increases the stiffness of an article made from the rubber. This is a disadvantage for applications in which a softer rubber is needed. For example, surgical gloves made of soft rubbers can provide greater tactile sensitivity for the wearer, which is desirable to improve the surgeon's "feel" during operations and to prevent fatigue of the hands.

A more comfortable nitrile glove that is easier to stretch, i.e. has lower elastic modulus, can be made using a polymer which contains less acrylonitrile or by crosslinking the polymer to a lesser degree. These changes, however, often compromise strength, chemical resistance, or both, resulting in articles that are unsuitable for many applications.

Accordingly, a soft rubber having strength and chemical resistance similar to stiffer rubbers is highly desirable.

SUMMARY OF THE INVENTION

An object of this invention is to provide soft nitrile rubber formulations which have strength and chemical resistance comparable to conventional stiffer rubber compositions.

Another object of the invention is to provide soft nitrile rubber articles, e.g., gloves, which are strong and provide good chemical resistance, while being softer and more comfortable than conventional articles.

Thus, in one aspect, the invention provides a method of making a nitrile rubber composition. The method includes the steps of combining a nitrile latex with a stabilizing agent and adjusting the pH of the nitrile latex to about 8.5–10.0 to yield a basic nitrile latex. The basic nitrile latex is contacted with a substantially zinc-oxide-free crosslinking agent and with at least one accelerator, to form a nitrile rubber composition. That composition is substantially free of zinc oxide.

In preferred embodiments, the stabilizing agent is ammonium caseinate. In preferred embodiments, the step of adjusting pH includes adding an alkali hydroxide to the nitrile latex. In preferred embodiments, the crosslinking agent is sulfur or a sulfur donor compound. In preferred embodiments, the accelerator is tetramethylthiuram disulfide in combination with mercaptobenzothiazole (MBT). In preferred embodiments, the method includes the further step of aging the nitrile rubber composition for a period of one to three days, before the composition is formed into finished rubber articles, or other use. In a preferred embodiment, the method includes the further step of curing the nitrile rubber composition to form a cured nitrile rubber composition. The invention further provides a cured nitrile rubber composition formed by the above-described method. In a preferred embodiment, the cured nitrile rubber composition is substantially free of divalent metal oxides. The invention also provides an article of manufacture comprising a layer of the cured nitrile rubber composition formed by the above-described method.

In another aspect, the invention provides a cured nitrile rubber composition. The cured nitrile rubber composition includes a nitrile latex, a stabilizing agent, a substantially zinc-oxide-free crosslinking agent, and an accelerator, and is substantially free of zinc oxide. Further, the cured nitrile rubber composition has a 300% modulus of elasticity less than about 1100 psi, preferably in the range of about 400 psi to about 1100 psi. In preferred embodiments, the cured nitrile rubber composition is further characterized in that the 300% modulus is in the range of about 500 psi to about 700 psi. In preferred embodiments, the cured nitrile rubber is further characterized in that the tensile strength is greater than about 5000 psi. In preferred embodiments, the rubber is substantially free of zinc. In preferred embodiments, the nitrile rubber is resistant to organic solvents.

In yet another aspect, the invention provides a cured nitrile rubber prepared from a nitrile latex base, a stabilizing agent, a crosslinking agent, and an accelerator, and the nitrile rubber is substantially free of zinc oxide. The cured nitrile rubber is also characterized by having a 300% modulus of elasticity in the range of about 400 psi to about 1100 psi, and by having a tensile strength greater than about 5000 psi.

In still another aspect, the invention provides a method of making a sulfur-cured nitrile rubber, comprising the steps of combining a carboxylated nitrile latex with a stabilizing agent, adjusting the pH of the nitrile latex to about 8.5–10.0 to yield a basic nitrile latex, and contacting the basic nitrile latex with a substantially zinc-oxide-free crosslinking agent selected from the group consisting of sulfur and sulfur donors, and with an accelerator, to form a nitrile rubber. The resultant nitrile rubber is substantially free of zinc oxide.

In another aspect, the invention provides a sulfur-cured carboxylated nitrile rubber, wherein the rubber is substantially free of zinc oxide, and further characterized in that the rubber has a 300% modulus of elasticity in the range of about 400 psi to about 1100 psi, and in that the cured rubber has a tensile strength greater than about 5000 psi.

In another aspect, the invention provides nitrile rubber compositions made according to any of the above methods.

In another aspect, the invention provides articles of manufacture made from any of the nitrile rubber compositions of the invention. A preferred article of manufacture is a glove. In preferred embodiments, a glove according to the present invention includes a layer of a cured nitrile rubber composition of the invention, the layer having a thickness of between about 3 mil and about 30 mil.

Other features, objects, and advantages of the present invention will become apparent from the following detailed description, drawings, and claims.

DETAILED DESCRIPTION OF THE INVENTION

Figure 1:
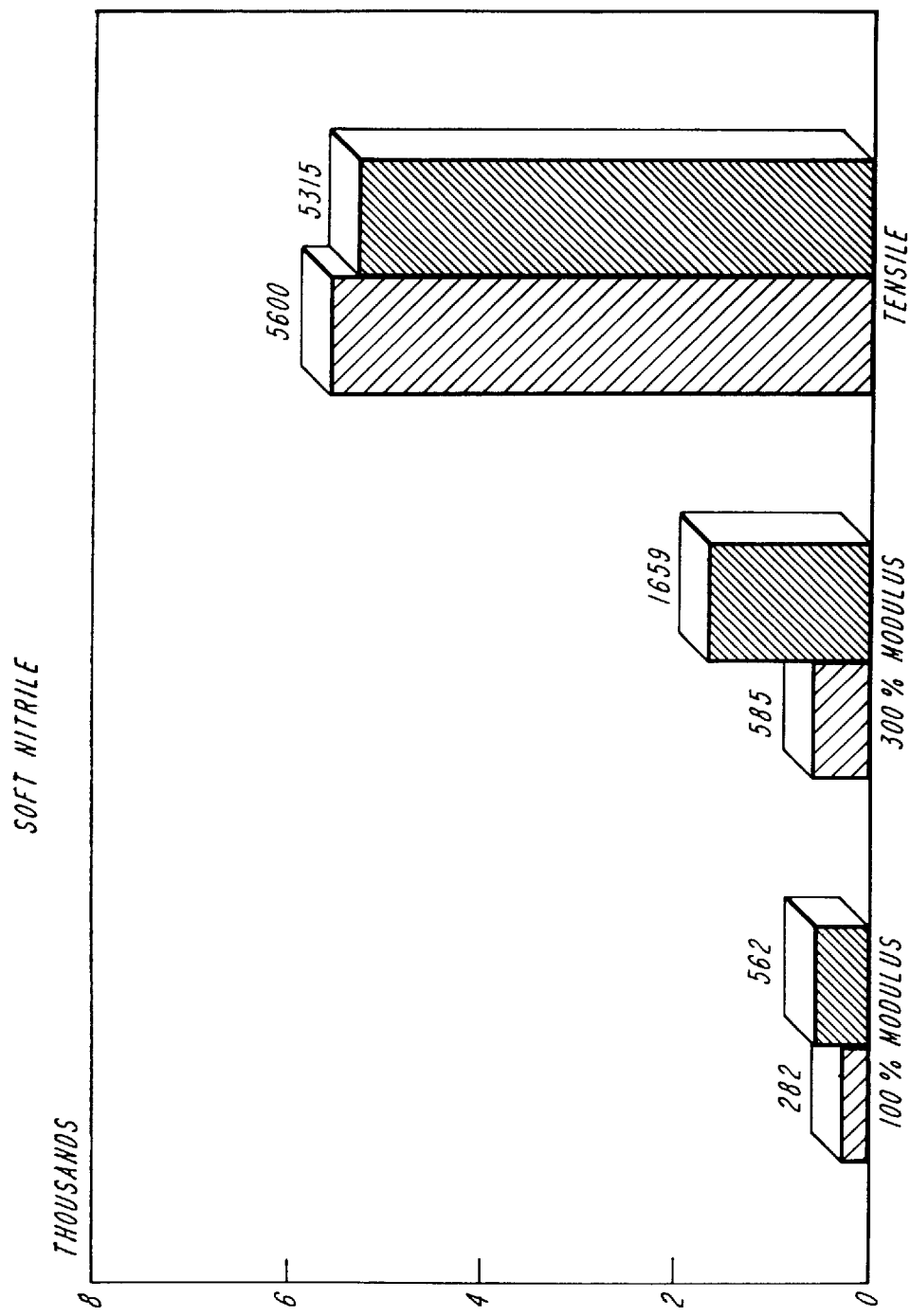
FIG. 1 is a bar graph comparing the physical properties of the rubber material of the invention to a commercially available rubber material.

The invention provides nitrile rubber formulations useful for manufacturing articles having good strength and chemical resistance while being softer (i.e., having a lower elastic modulus) than many previously known rubber formulations. The invention also provides methods of making such nitrile rubber compositions, and articles of manufacture made thereof.

The term "nitrile latex" is art-recognized and refers to a synthetic rubber latex used in the manufacture of elastomers. Nitrile latexes can be carboxylated or noncarboxylated; carboxylated nitrile latexes are preferred.

As described further below, the nitrile compositions of the invention are preferably substantially free of zinc oxide. The term "substantially free of zinc oxide," as used herein, refers to a nitrile rubber composition in which zinc oxide is not present in an amount effective to significantly crosslink components of the nitrile rubber, e.g., the carboxylate moieties of a carboxylated nitrile rubber. However, it will be understood by the skilled artisan that the inventive compositions are preferably substantially free of other compounds, e.g., other metallic oxides, which could crosslink, and thereby stiffen, carboxylate moieties of cured rubber materials. Thus, although reference is made herein to compositions which are substantially free of zinc oxide, in certain preferred embodiments, the compositions are also substantially free of other metallic compounds, particularly divalent metal oxides such as lead oxide, magnesium oxide, and the like, which can ionically crosslink carboxylate moieties of rubber materials. The term "divalent metal oxide," as used herein, refers to an oxide of a divalent metal, i.e., a metal in the +2 oxidation state. Exemplary divalent metal oxides include ZnO, PbO, BaO, MgO, CaO, and the like.

I. Compositions

Carboxylated nitrile latexes suitable for use in the methods and compositions of the invention are known in the art, and are commercially available. While any carboxylated nitrile latex can be employed, latexes having high levels of acrylonitrile are preferred due to the increased chemical resistance of such compositions. For example, carboxylated nitrile latexes such as Perbunan N latex KA8250 and KA8425 (Bayer Corp.), are suitable for use in the subject invention. Other latexes, such as Tylac 68-074 and 68-065 (Reichhold Chemical) are also suitable. Perbunan N latex KA8250 is preferred. However, in certain embodiments, a nitrile latex with a lower level of acrylonitrile can be employed. Although an article made from such a latex would generally have lowered resistance to hydrocarbons, the article would also be softer than an article made from a high acrylonitrile latex, which is an advantage, e.g., in medical gloves.

In general, the use of stabilizers in the subject rubber formulations can decrease agglomeration of latex particles, reducing the formation of defects in articles, such as gloves, made from the rubber formulation. Thus, in certain embodiments, the use of a stabilizer in an amount effective to prevent agglomeration, is preferred. The amount of stabilizer required will vary according to factors such as the nitrile latex employed, the pH of the formulation, and other factors. The skilled artisan will be able to determine appropriate amounts of a stabilizer. In preferred embodiments, the stabilizer is an emulsifier such as linear sodium dodecylbenzene sulfonate. Other stabilizers include sodium 2-ethylhexyl sulfate. Sodium dodecylbenzene sulfonate, when employed, is preferably present in amounts up to about 1.0 phr. Sodium 2-ethylhexyl sulfate is preferably present in a range from about 0.01 phr to about 1.0 phr, and more preferably about 0.05 phr. The amount of stabilizer employed should be controlled to prevent foaming of the nitrile latex.

In preferred embodiments, a protective colloid is present as stabilizer. A protective colloid can prevent the latex from becoming excessively viscous. Viscosity is a problem in nitrile latexes, particularly at higher pH levels, e.g., at pH above about 8.0. Extreme viscosity can lead to gelation of the latex, which is highly undesirable. Accordingly, at high pH, a protective colloid is preferably added to the latex. However, the level of protective colloid should be carefully controlled to avoid problems such as slow curing of the nitrile rubber composition. The amount of protective colloid required depends on characteristics of the latex such as pH, solids level, and particle size distribution. A preferred protective colloid is ammonium caseinate. In preferred embodiments, ammonium caseinate is present in the range of about 0.1 to about 1.0 phr, more preferably about 0.2 to about 0.4 phr. Other exemplary protective colloids include plant hydrocolloids such as sodium alginate, proteins other than casein, and other water soluble polymers such as polyvinyl alcohol. In certain embodiments, the protective colloid may be omitted. For example, addition of water to a latex generally reduces the need for a protective colloid, although a thinner latex frequently results. Such a thin latex may be preferred for manufacturing thin rubber articles.

As described above, when zinc oxide is omitted from previously known nitrile rubber compositions (which typically have a pH of 7.5–8.5), articles made from the nitrile rubber will frequently suffer from low tensile strength and decreased chemical resistance compared to nitrile rubbers which contain zinc oxide. Sulfur-based cure systems are usually retarded by the presence of acidic materials, and are often more active in the presence of alkaline materials (i.e., at higher pH). We have now discovered that if the pH of the nitrile latex is raised to a range of 8.5–9.5, more preferably about 8.9–9.2, an improved cure results. While not wishing to be bound by any theory, it is believed that the higher pH level of the inventive compositions results in effective activation of the sulfur cure system (described below) and improves the cure rate. The specific pH needed can vary depending on the particular nitrile latex being used, but can be readily determined by the skilled artisan using no more than routine experimentation. In a preferred embodiment, the pH of the latex is raised to at least about 8.5 by addition of an alkali metal hydroxide. Exemplary alkali metal hydroxides include lithium, sodium, and potassium hydroxides, with potassium hydroxide being preferred. However, other strong bases can also be used to raise the pH of the nitrile latex composition. In preferred embodiments, an aqueous solution of an alkali metal hydroxide is added to the nitrile latex. In general, slow addition of the alkali metal hydroxide provides superior results and is preferred.

The use of sulfur and sulfur donors (collectively, "sulfur compounds") for vulcanizing (covalently crosslinking) carboxylated nitrile latexes is known in the art. A sulfur compound, optionally in combination with an accelerator (which reduces the time required for vulcanization) and/or an activator (i.e., a compound which increases the potency of an accelerator), is referred to herein as a "cure system." Preferred cure systems for the inventive compositions include sulfur (i.e., elemental sulfur) and sulfur donors, in combination with at least one accelerator. A variety of accelerators useful in the present invention are known in the art (see, e.g., U.S. Pat. No. 5,326,828). Preferred accelerators include zinc dibutyl dithiocarbamate (sometimes referred to as butyl zimate), sodium dibutyl dithiocarbamate, MBT (mercaptobenzothiazole) and TMTD (tetramethyl thiuram disulfide); MBT and TMTD are generally employed in combination. Butyl zimate is effective for curing of carboxylated nitrile compositions having varied, e.g., low or high acrylonitrile content, while the combination of MBT and TMTD is generally less effective for low-acrylonitrile formulations. Butyl zimate is also more active than MBT and TMTD at lower temperatures. Accordingly, in certain embodiments, butyl zimate is a preferred accelerator. However, in other preferred embodiments, e.g., if a substantially zinc-free nitrile rubber composition is desired, either sodium dibutyl dithiocarbamate or the combination of MBT and TMTD is preferred as the accelerator. A nitrile rubber that is substantially free of zinc preferably does not include zinc, from any source, in an amount effective to significantly crosslink components of the nitrile rubber, e.g., the carboxylate moieties of a carboxylated nitrile rubber. In certain embodiments, combinations of accelerators can be employed.

The nitrile mixture can optionally also include additives commonly used in making cured latex products, including pigments, plasticizers, processing agents, coagulants, and the like. A preferred pigment is titanium dioxide, which is useful when a non-transparent article is desired. It is believed that titanium dioxide does not ionically crosslink carboxylate moieties of rubber materials, and therefore does not undesirably stiffen the rubber materials of the invention. Plasticizers can be added to improve the "wet gel strength" of the nitrile rubber.

In preferred embodiments, nitrile rubber compositions of the invention are substantially free of zinc oxide. As described above, the use of zinc oxide in carboxylated nitriles is generally associated with stiffening of the cured rubber. By eliminating the use of zinc oxide, the present invention provides a nitrile rubber that is softer than many conventional nitrile rubbers, and yet has strength and solvent-resisting qualities comparable to conventional materials, as shown in Example 2, below.

As the skilled artisan will appreciate from the description herein, the nitrile rubber compositions of the invention are economical in that they generally do not require the use of additional expensive reagents. Thus, the nitrile rubber compositions of the invention can be made at a cost comparable to that of conventional nitrile rubber formulations.

II. Methods

Methods of compounding nitrile rubber formulations are known in the art. Thus, the compositions described above can be made using standard rubber processing equipment and techniques, thereby avoiding retooling, which can be expensive. The invention thus provides economical nitrile rubber compositions and articles of manufacture. As described below, certain components of the nitrile rubber can be added at any time during the compounding process, while other components are preferably added in a specific order.

In general, the compounding process begins with a water-based carboxylated nitrile latex, which is usually stirred or agitated throughout the compounding process to ensure efficient mixing. Stabilizers, including protective colloids, are generally added before the pH of the latex is raised. The pH of the latex is raised, and the cure system is then added. Dispersions of pigments, if desired, can be added at any stage.

Once all components have been added, the composition is preferably aged for one to five days, more preferably from one to three days, before forming into finished articles or other use. The aging period improves the dipping qualities of the latex and results in finished articles having fewer defects.

Articles of manufacture can be made from the inventive compositions according to methods known in the art. Exemplary manufacturing methods include casting, dipping, molding, and the like. Articles such as gloves, condoms, and the like are often made by dipping a form into the latex compositions, thereby preparing a latex film on the surface of the form. The residence time of the form in the latex composition can be selected to obtain a film of a desired thickness on the form.

The form is preferably dipped in a coagulant solution prior to dipping in the latex composition. A preferred coagulant solution includes calcium ions; a preferred calcium compound is calcium nitrate. A preferred coagulant solution is a solution of calcium nitrate; the solution is preferably in water or an alcohol such as methanol or ethanol. Use of a coagulant can result in a cured rubber having increased strength, e.g., tensile strength.

After the form has been dipped in the coagulant solution and into the nitrile latex composition, the form (with latex film coating thereon) is preferably immersed in a wash fluid, preferably water, to remove residual coagulant and other (generally water-soluble) materials from the latex film. The washing time will vary according to the nitrile latex composition and the coagulant solution employed; a time period of about twenty minutes to about forty minutes is generally suitable. The latex film is then removed from the wash bath and dried and cured to produce a rubber article. The latex is generally dried at elevated temperature, e.g., a temperature above 100° F., more preferably in the range from about 150° F. to about 210° F. The time required for drying can be selected to ensure any desired level of moisture in the film prior to curing. The curing process usually requires somewhat higher heat than drying; preferred temperatures for curing range from about 200° F. to about 300° F. The article is cured until a desired cure state is achieved.

After curing, the rubber articles can optionally be further treated according to known methods, e.g., by chlorination, followed by neutralization and drying. When all treatments, if any, are completed, the articles can be stripped from the forms and packaged.

The cured nitrile rubber formulations of the invention are softer, i.e., have lower elastic modulus, than many conventional industrial nitrile rubbers, but the inventive nitrile rubbers have good strength and chemical resistance. Thus, in one aspect, the invention provides a nitrile rubber material which, when cured, has a 300% modulus less than about 1100 psi (pounds per square inch). In preferred embodiments, the cured nitrile rubber has a 300% modulus in the range of about 400 psi to about 1100 psi, more preferably about 500 psi to about 700 psi. In preferred embodiments, the cured nitrile rubber material has a tensile strength greater than about 5000 psi, more preferably greater than about 5500 psi. In preferred embodiments, the cured nitrile rubber material has a chemical resistance characterized by an increase of less than about 7% in area after 24 hour exposure to hexane at room temperature, more preferably less than about 5% increase in area, and still more preferably less than about 3% increase in area, and most preferably about less than about one percent increase in area after 24 hour exposure to hexane. A cured nitrile rubber material having less than about 7% increase in area after 24 hour exposure to hexane is referred to herein as "chemically resistant." In certain preferred embodiments, the cured nitrile rubber material has a chemical resistance characterized in that there is no permeation breakthrough of carbon tetrachloride after seven hours exposure, as measured according to ASTM method F739. In preferred embodiments the cured nitrile rubber material is substantially impermeable to water, i.e., liquid water and water vapor.

Gloves manufactured according to the methods of this invention preferably have a layer of a cured nitrile rubber of the invention having a thickness of between about 3 mil and about 30 mil. Thin gloves provide better feel for the wearer, which is desirable, e.g., for surgical gloves. Accordingly, surgical gloves preferably include a layer of a cured nitrile rubber of the invention having a thickness between about 3 mil and 11 mil, more preferably between about 5 mil and 10 mil. Thicker gloves provide better strength and chemical resistance, which is desirable, e.g., for laboratory or industrial gloves. Thus, laboratory or inductrial gloves preferably include a layer of a cured nitrile rubber of the invention having a thickness between about 10 mil and 30 mil, more preferably between about 15 mil and 28 mil Of course, the skilled artisan will appreciate that the cured nitrile rubber layer of such gloves (or other articles) can be thicker than 30 mils, if greater protection is desired. The improved soft qualities of the inventive nitrile compositions make possible gloves that are thicker than conventional gloves but which are not unduly rigid or uncomfortable.

The invention also contemplates composite articles comprising a layer of a cured nitrile rubber of the invention. Thus, for example, a layer of a cured nitrile rubber of the invention can be adhered to a layer of another material, e.g., a different rubber or plastic, to form a composite article. Such composite articles can, in some embodiments, provide qualities such as increased chemical resistance, puncture resistance, or tensile strength compared to conventional articles.

In another aspect, the invention provides a substantially zinc-free nitrile rubber composition which has low elastic modulus but high tensile strength and chemical resistance. In this aspect, it is preferable to employ an accelerator which does not contain zinc. Suitable zinc-free accelerators include sodium dibutyl dithiocarbamate or MBT and TMTD, as described above.

EXAMPLE 1

A carboxylated nitrile rubber formulation was prepared as follows using the amounts of the components shown in Table 1. All amounts are given in parts per hundred dry rubber (phr).

TABLE 1

| Perbunan N Latex KA8250 | 100 phr |
| Ammonium Caseinate | 0.25 phr |
| Potassium Hydroxide | 1.0 phr |
| Sulfur | 1.0 phr |
| Butyl Zimate | 0.50 phr |
| Titanium Dioxide | 1.0 phr |
| Phthalocyanine Blue | 0.10 phr |
| Sodium 2-Ethylhexyl Sulfate | 0.05 phr |
| Zinc Oxide | 0 phr |

Notes: phr = parts per 100 parts of rubber.
Butyl Zimate = Zinc Dibutyl Dithiocarbamate.

First, the proper amount of latex (Perbunan N latex KA8250, Bayer Corp.) was weighed into a mixing vessel. The latex was strained to remove contamination, including coagulated pieces of rubber, and a stirrer was placed in the vessel; the latex was stirred throughout the compounding procedure. The level of agitation was sufficient to disperse the other ingredients quickly as they were added; optionally, a small amount of defoamer can be added if necessary.

Next, stabilizers were added to the latex. In this example, sodium 2-ethyl hexyl sulfate was used to improve the appearance and quality of articles made from the nitrile rubber by preventing runback of the latex after dipping. Ammonium caseinate, a protective colloid, was added to prevent excessive viscosity of the latex and to control the rate at which the cure system chemicals affect the rubber particles in the latex. The protective colloid was mixed into the latex for 20–30 minutes before proceeding.

Next, an eight percent solution of potassium hydroxide in water was slowly added to raise the pH of the formulation to about 8.9–9.2. The sulfur/butyl zimate cure system used in this example is effective at lower pH levels than cure systems with other accelerators.

Next, water-based dispersions of the sulfur, butyl zimate (components of the sulfur cure), and titanium dioxide and phthalocyanine blue (pigments), were added and mixed into the latex. No zinc oxide was used. The formulation was allowed to mix for at least 60 minutes, strained again, and then aged for 1–5 days before dipping to form finished articles.

EXAMPLE 2

Gloves were made from the nitrile latex prepared in Example 1, supra, by the following procedure Ceramic glove forms were cleaned with standard surfactant solutions before use. The clean forms were preheated in an oven to a temperature in the range of 170° F. to 220° F. The forms were then dipped into a coagulant solution of calcium nitrate, followed by dipping into the latex compound described in Example 1. The thickness of the glove is determined, at least in part, by the length of the latex dipping period.

The latex-coated forms were then dipped into water for 20–40 minutes to remove residual calcium nitrate and other water-soluble materials. The forms were then heated in an oven for a time sufficient to dry the gloves, and were further heated to cure the rubber; the drying generally was performed at about 160–210° F., and the curing was performed at about 240–300° F.

Finally, the finished gloves were stripped off the forms. A sample was cut from a glove produced by the above method, and several tests were performed. The results of the tests are graphically depicted in FIG. 1 (the scale is thousands of pounds per square inch). As shown in FIG. 1, the glove of the invention ("Soft Nitrile") is softer (i.e., has a lower elastic modulus) than a commercially-available nitrile glove ("Pdn Nitrile," a 14-mil-thick glove available from North Safety Products, product code LA142G). The glove of the invention is slightly stronger than the commercially available glove, as shown by the greater tensile strength of the subject glove.

Figure 2:
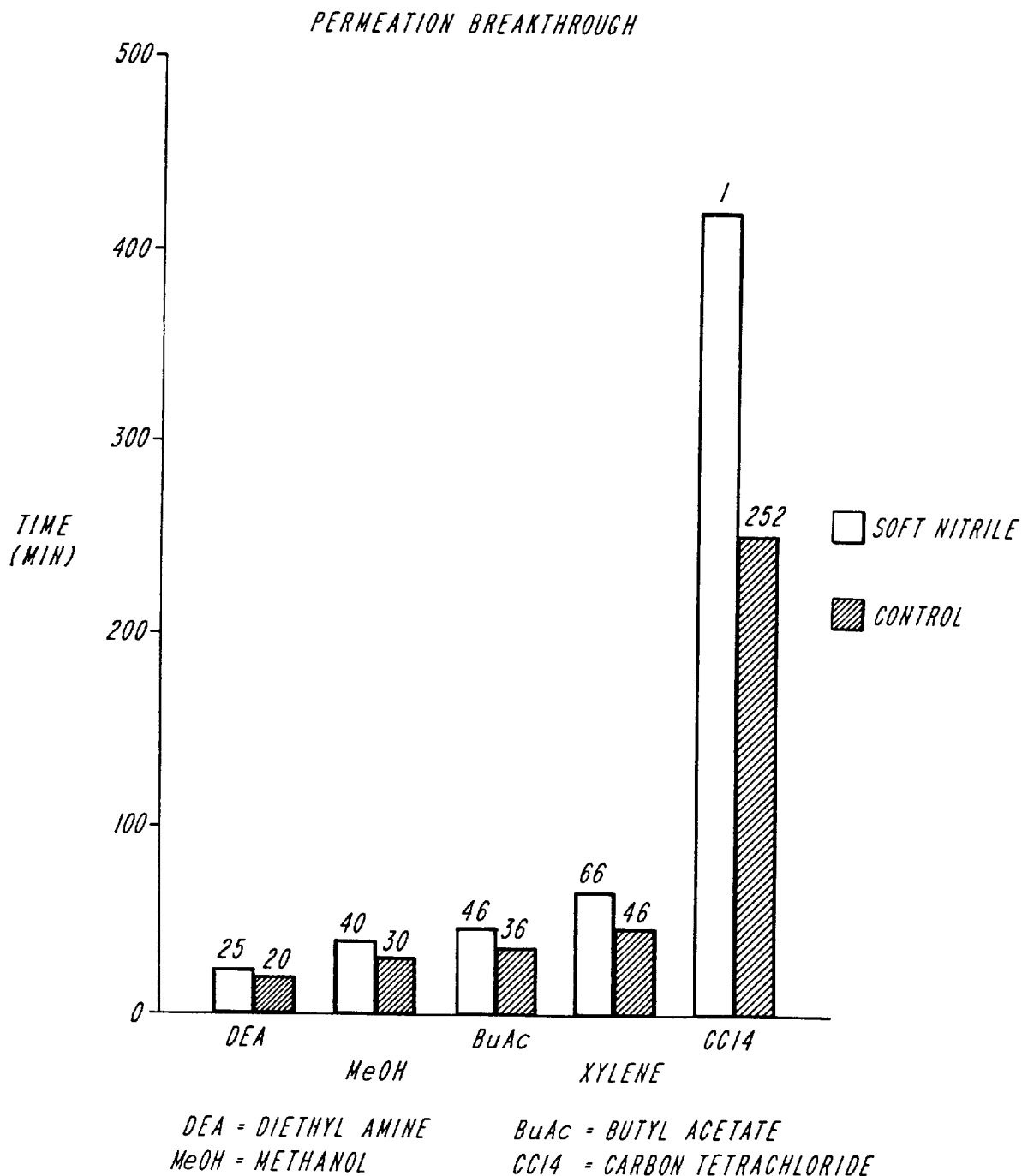
FIG. 2 is a bar graph comparing the chemical resistance of the rubber material of the invention to a commercially available rubber material.

The chemical resistance of the glove produced as described above, as measured according to ASTM method F739, is graphically depicted in FIG. 2. The subject material ("Soft Nitrile") provides greater resistance to chemicals than the control material, a commercially available nitrile latex rubber (a 15-mil-thick glove available from North Safety Products, product code LA153G). The material of the invention provides improved levels of permeation resistance to all chemicals tested, compared to the control nitrile rubber formulation. The cured nitrile rubber of the invention provides excellent resistance to permeation breakthrough with carbon tetrachloride, with which no breakthrough was seen even after seven hours. The subject nitrile rubber material also exhibited an increase in area (swelling) of less than 1% after 24 hour exposure to hexane at room temperature.

Thus, the cured nitrile rubber of the invention provides improved softness, while maintaining strength and chemical resistance comparable to, or superior to, a conventional nitrile rubber. The subject nitrile rubber is also free of zinc oxide, and, if a zinc-free accelerator is employed, can be made substantially zinc-free. In certain embodiments, the subject nitrile rubber compositions are substantially free of divalent metal ions.

The contents of all publications cited throughout this specification are hereby incorporated by reference in their entirety.

EQUIVALENTS

Those skilled in the art will recognize, or be able to ascertain using no more than routine experimentation, numerous equivalents to the specific procedures described herein. Such equivalents are considered to be within the scope of this invention and are covered by the following claims.

What is claimed is:

1. A method of making a nitrile rubber composition, comprising the steps of
    combining a nitrile latex with a stabilizing agent,
    adjusting the pH of the nitrile latex to about 8.5–10.0 to yield a basic nitrile latex, and
    contacting the basic nitrile latex with a crosslinking agent and with at least one accelerator, and selecting said crosslinking agent to be substantially free of metallic oxide that ionically crosslinks carboxylic acid moieties of the latex to form a nitrile rubber composition.

2. A method according to claim 1, wherein the stabilizing agent is selected from the group consisting of ammonium caseinate, sodium alginate, and polyvinyl alcohol.

3. A method according to claim 1, wherein the step of adjusting pH includes adding an alkali hydroxide to the nitrile latex.

4. A method according to claim 1, wherein the crosslinking agent is a sulfur compound.

5. A method according to claim 1, wherein the at least one accelerator comprises tetramethylthiuram disulfide and mercaptobenzothiazole.

6. A method according to claim 1, comprising the further step of aging the nitrile rubber composition for a period of one to three days before use.

7. The method of claim 1, comprising the step of further curing the nitrile rubber composition to form a cured nitrile rubber composition.

8. A method of making a sulfur-cured nitrile rubber, comprising the steps of
    combining a carboxylated nitrile latex with a stabilizing agent,
    adjusting the pH of the nitrile latex to about 8.5–10.0 to yield a basic nitrile latex, and
    contacting the basic nitrile latex with a crosslinking agent selected from the group consisting of sulfur and sulfur donors, and with an accelerator, to form a nitrile rubber,
    wherein the resultant sulfur-cured nitrile rubber is substantially free of metallic oxide that ionically crosslinks carboxylic acid moieties of the latex.

9. A method of making a nitrile rubber composition, comprising the steps of
    combining a nitrile latex with a stabilizing agent,
    adjusting the pH of the nitrile latex to about 8.5–10.0 to yield a basic nitrile latex, and
    contacting the basic nitrile latex with a sulfur crosslinking agent and with at least one accelerator, and selecting the sulfur crosslinking agent to be free of a metallic oxide crosslinking agent, thereby forming a nitrile rubber composition,
    wherein the nitrile rubber composition contains no metallic oxide crosslinking agent.

10. A method of making a sulfur-cured nitrile rubber, comprising the steps of
    combining a carboxylated nitrile latex with a stabilizing agent,
    adjusting the pH of the nitrile latex to about 8.5–10.0 to yield a basic nitrile latex, and
    contacting the basic nitrile latex with a sulfur crosslinking agent selected from the group consisting of sulfur and sulfur donors and with an accelerator, to form a nitrile rubber,
    wherein the sulfur-cured nitrile rubber is substantially free of a metallic oxide as a crosslinking agent.

* * * * *